(12) United States Patent
Kholodkov et al.

(10) Patent No.: US 11,748,321 B2
(45) Date of Patent: *Sep. 5, 2023

(54) TIME-SERIES DATA CONDENSATION AND GRAPHICAL SIGNATURE ANALYSIS

(71) Applicant: Microsoft Technology Licensing, LLC, Redmond, WA (US)

(72) Inventors: Dmitry V. Kholodkov, Sammamish, WA (US); Donovan A. Isaak, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

This patent is subject to a terminal disclaimer.

(21) Appl. No.: 17/498,898

(22) Filed: Oct. 12, 2021

(65) Prior Publication Data

US 2022/0027332 A1 Jan. 27, 2022

Related U.S. Application Data

(63) Continuation of application No. 16/511,330, filed on Jul. 15, 2019, now Pat. No. 11,176,109.

(51) Int. Cl.
*G06F 16/215* (2019.01)
*G06F 21/64* (2013.01)
*G06T 11/20* (2006.01)
*G06F 16/22* (2019.01)

(52) U.S. Cl.
CPC ........ *G06F 16/215* (2019.01); *G06F 16/2228* (2019.01); *G06T 11/206* (2013.01)

(58) Field of Classification Search
CPC .. G06F 16/215; G06F 16/2228; G06F 21/552; G06T 11/206; H03M 7/46
See application file for complete search history.

(56) References Cited

U.S. PATENT DOCUMENTS

| | | | |
|---|---|---|---|
| 5,631,874 A * | 5/1997 | Mastin | G01V 1/22 367/134 |
| 8,880,670 B1 * | 11/2014 | Lansing | H04L 12/1822 370/254 |
| 10,776,888 B1 * | 9/2020 | Corbett | G06Q 30/0645 |
| 10,810,210 B2 * | 10/2020 | Choudhury | G06F 16/2379 |
| 2002/0152056 A1 * | 10/2002 | Herzog | G06F 17/18 703/2 |
| 2010/0329453 A1 * | 12/2010 | Mehmood | H04L 9/3273 380/44 |
| 2019/0114041 A1 * | 4/2019 | Pitkänen | G06F 11/3075 |

* cited by examiner

*Primary Examiner* — Etienne P Leroux
(74) *Attorney, Agent, or Firm* — Newport IP, LLC; Leonard J. Hope

(57) ABSTRACT

Methods and systems for condensing a sequential data set on a computer system. A sequential data set is received by the computer system and analyzed to identify a number of occurrences in the sequential data set of each of a plurality of unique data value pairs. A condensed data set is generated including a data element for each of the unique data value pairs. Each data element in the condensed data set includes an identification of the first data value and the second data value of the unique data value pair as well as a count indicative of the number of occurrences in the sequential data set of the first data value immediately followed by the second data value. A graphical signature is generated including a plurality of vectors each extending between two nodes corresponding to the data values of a different data element.

18 Claims, 8 Drawing Sheets

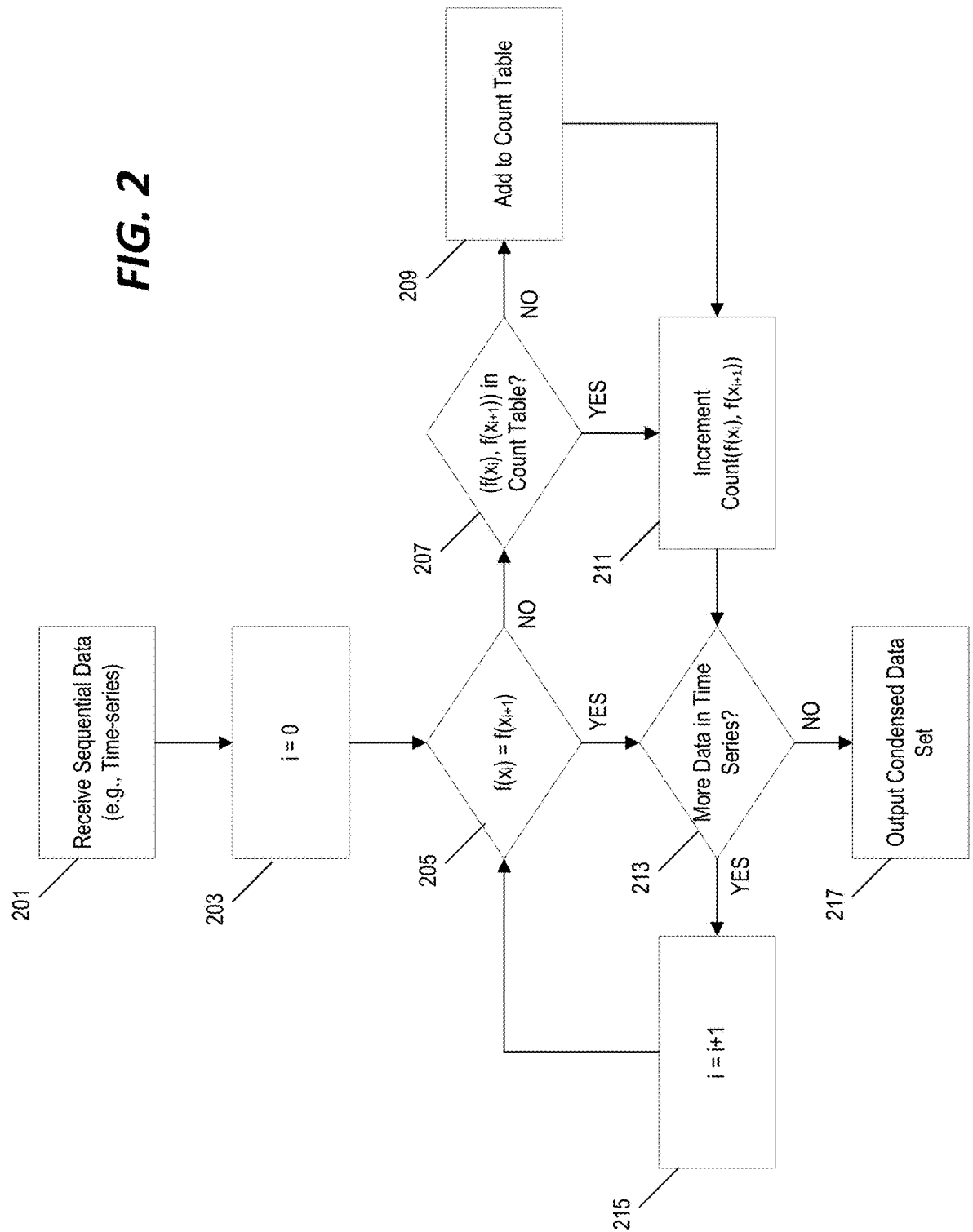

TIME-SERIES DATA CONDENSATION AND GRAPHICAL SIGNATURE ANALYSIS

RELATED APPLICATIONS

This application is a continuation of U.S. patent application Ser. No. 16/511,330, filed Jul. 15, 2019, entitled "TIME-SERIES DATA CONDENSATION AND GRAPHICAL SIGNATURE ANALYSIS," the entire contents of which are hereby incorporated by reference.

FIELD

Embodiments described herein relate to systems and methods for storing, viewing, and analyzing sequential data including, for example, time-series data.

SUMMARY

Modern systems and services are continuing to become more complex with an ever-growing number of features and functions. Modern monitoring systems can be configured to detect problems, but the increasingly large number of data points collected in a time-series (for example, in a telemetry environment) can make it difficult to visualize the data in a meaningful way in charts and "dashboards." In some of the examples described herein, information from a large volume of time-series data is condensed into a much smaller number of data points that can significantly simplify storage and analysis of the data including, for example, diagnostic analysis of fluctuations in telemetric service behavior. The systems and method described herein are, among other things, able to distinguish between significant drops in reliability and normal operation deviations. Furthermore, a condensed graphical representation of the time-series data (i.e., a "graphical signature") provides a new simplified language that can streamline interpretation of a set of time-series data for any given duration of time while also providing a visualization of the temporal dimension as a directional plane. Certain systems and methods described herein also reduce noise of individual operation-specific deviations and focuses on isolation & identification of anomalous events in the time-series data.

One embodiment provides a method for condensing a sequential data set on a computer system. A sequential data set is received by the computer system as a plurality of data values in a serial sequence. The computer system analyzes the sequential data set to identify a number of occurrences in the sequential data set of each of a plurality of unique data value pairs. Each unique data value pair includes a first data value and a second data value that is different than the first data value. The computer system then generates a condensed data set based on the sequential data set. The condensed data set includes a data element for each of the plurality of unique data value pairs. Each data element includes an identification of the first data value of the unique data value pair, and identification of the second data value of the unique data value paid, and a count indicative of the number of occurrences in the sequential data set of the first data value of the unique data value pair immediately followed by the second data value of the unique data value pair.

Some embodiments generate, by the computer system, a graphical signature indicative of the content of the sequential data set. The graphical signature includes a plurality of nodes and a plurality of vectors extending between different nodes. The nodes each correspond to a different data value in the condensed data set. Each vector corresponds to a different data element of the condensed data set and appears in the graphical signature as a line beginning at a node corresponding to the first data value of the data element and extending to a node corresponding to the second data value of the data element.

These and other features, aspects, and advantages will be apparent from a reading of the following detailed description and a review of the associated drawings. It is to be understood that both the foregoing general description and the following detailed description are explanatory and do not restrict aspects as claimed.

BRIEF DESCRIPTION OF THE DRAWINGS

FIG. 2 is a flowchart of a method for condensing time-series data using the system of FIG. 1.

DETAILED DESCRIPTION

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

Figures 1, 3, 4:
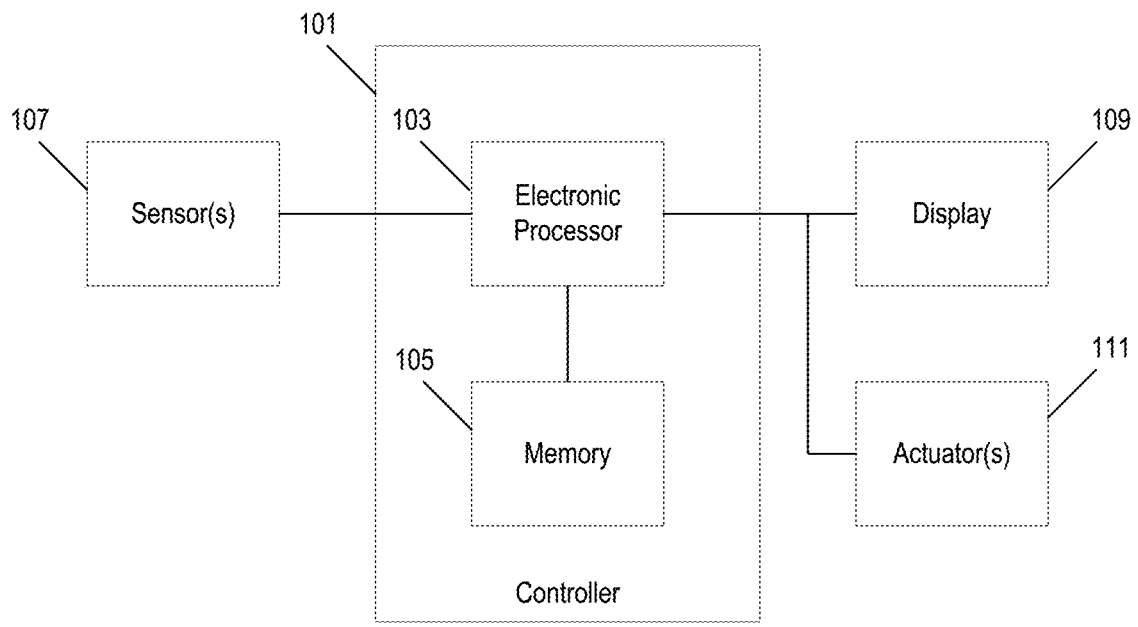
FIG. 1 is a block-diagram of a system for capturing time-series data, condensing the captured time-series data, and displaying a graphical signature indicative of the time-series data according to one embodiment.
FIG. 3 is a table listing an example of time-series data captured by the system of FIG. 1.
FIG. 4 is a table listing the condensed data generated by the method of FIG. 2.

FIG. 1 illustrates an example of a system configured to collect, analyze, condense, and visually present time-series data in a graphical format. The system of FIG. 1 includes a controller 101 with an electronic processor 103 and a non-transitory computer-readable memory 105. The memory 105 stores data and instructions that are executed by the electronic processor 103 to provide the functionality of the controller 101 including the functionality described in the examples below. In some implementations, the controller 101 may be implemented as a computer (e.g., a desktop computer or a server) while in other implementations, the controller may be implemented as an embedded system. One or more sensors 107 are communicatively coupled to the controller 101 and are configured to collect and provide time-series data to the controller 101. The collected time-series data is then stored to the memory 105 and/or analyzed by operations executed by the electronic processor 103.

The sensors 107 can includes any type of sensor configured to monitor and collect time-series data. For example, the sensor 107, in some implementations, may include electrodes configured to monitor a heart rate or ECG of a human patient. In other implementations, the sensors 107 may include components configured to monitor performance of a CPU (e.g., execution speed, etc.) or data transmission rates. In some implementations, the sensors 107 are directly coupled to the controller 101 via a wired or wireless communication interface. However, in other implementations, the sensors 107 are provided as a "client" computer or device (or a part of a client computer or device) and the controller 101 is provided as a remote computer server or cloud computing environment.

A display 109 is also communicatively coupled to the controller 101 and configured to display, for example, a graphical user interface and data in a numeric, textual, and/or graphical format based on output received from the controller 101. In some implementations, the controller 101 may also be communicatively coupled to one or more actuators 111 and configured to operate the one or more actuators 111 to perform an operation based on an analysis of the time-series data. For example, in some implementations, the actuator 111 may include a patient alarm and the controller 101 may be configured to automatically activate the patient alarm in response to determining that the collected time-series data is indicative of an emergency heart condition (e.g., a heart attack). In other implementations, the controller 101 may be configured to activate or utilize additional computing resources in response to determining that the collected time-series data is in indicative of an abnormality or deficiency in a computing environment.

Sequential data is captured by the system of FIG. 1 as a series of values (e.g., integer values) output by the sensor(s) 107. Time-series data is one example of sequential data in which a new data value is measured/recorded at a defined sampling frequency. Depending on the duration over which the time-series data is collected and the sampling frequency used, the amount of data points in a set of time-series data can be exceptionally large. Accordingly, storage and analysis of sequential data—such as, for example, time-series data—can be improved by mechanisms for condensing (or compressing) the collected data while preserving sufficient information for analysis of the original sequential data.

FIG. 2 illustrates an example of a method for condensing sequential data. Although the examples described herein specifically address "time-series data", in other implementations, the systems and methods described herein may be extended to other types of data sequences. The method of FIG. 2 cycles through the time-series data by comparing each pair of adjacent data points in the time-series and counting how many times each unique combination of data values occurs as a sequential pair of data points.

As illustrated in FIG. 2, the time-series data is collected by the sensor 107 and provided to the controller 101 (step 201). As additional data is received from the sensor 107, it is stored to the memory 105 for later analysis. The collected time-series data is then processed sequentially to analyze each pair of adjacent data elements in the time-series. For example, a counter (i) may be set to zero (step 203) to begin analysis at the beginning of the data set. The value of the first data point ($f(x)$) is compared to the value of the next sequential data point ($f(x_{i+1})$) (step 205). If the adjacent data points have different values, then the system checks to see if the data value pair ($f(x_i)$, $f(x_{i+1})$) is already included in a count table for the data set (step 207). If not, then the data value pair is added to the count table as a new unique pair of data values (step 209) and a "count" value for that new data value pair is incremented (i.e., to "1") (step 211). If the analysis has not yet reached the end of the time-series data (step 213), then the loop counter i is incremented (step 215) and the controller 101 analyzes the next pair of data points in the time-series data (step 205).

As noted above, if the adjacent data values are not equal and the same pair of data values is not already included in the count table, then the controller 101 includes the new data value pair as a new entry in the count table (step 209). However, when the controller 101 subsequently encounters the same sequential pair of data values, then the controller 101 simply increments the "count" value for that data value pair in the count table (step 211). Furthermore, if the controller 101 finds that two sequential data points in the time-series have the same value, then the controller 101 simply moves on to the next sequential pair of data items without modifying the count table. Once the controller 101 has analyzed every sequential pair of adjacent data points in the time-series (step 213), then the count table is output as a condensed representation of the time-series data set (step 217).

To further illustrate the method of FIG. 2, FIG. 3 provides an example of a very small time-series data set in which the x value is indicative of the time at which the data point was collected and they y value is the measured value of a sensor output at time x (i.e., y=f(x)). FIG. 4 is an example of the condensed representation of the data set of FIG. 3 generated by the method of FIG. 2.

The first pair of adjacent data points in the time-series of FIG. 3 is (1,0) and (2,0). The measured value (y) of the two adjacent data points (in this case $f(x_i)=0$ and $f(x_{i+1})=0$) are compared by the controller 101 (step 205, FIG. 2) and determined to be the same value. Accordingly, the method of FIG. 2 moves on to the next sequential pair of data points without modifying the count table. The second pair of adjacent data points in the time-series of FIG. 3 is (2,0) and (3,2). The controller 101 determines that the measured value (y) of these two sequential data points are different (i.e., "0" and "2") (step 205). Accordingly, the controller 101 adds the data value pair as a new entry in the count table of FIG. 4 (step 209) and increments the "count" column for the new data value pair in the count table (step 211). The third pair of adjacent data points in the time-series of FIG. 3 is (3,2) and (4,3). This is again a new combination of non-equal values and, therefore, the data value pair is added as a new entry in the count table (step 209).

The method of FIG. 2 continues until the Y values of every sequential pair of data items in the time-series are analyzed and the count table is updated accordingly. After completion of this condensation method, the count table of FIG. 4 indicates that the data value y=0 was immediately followed sequentially in the time-series data set by the data value y=2 two different times (i.e., at $x_i$=2 & $x_{i+1}$=3 and at $x_i$=7 & $x_{i+1}$=8). Furthermore, the data value y=2 was immediately followed sequentially by the data value y=3 twice, the data value y=3 was followed sequentially by the data value y=1 once, the data value y=1 was followed sequentially by the data value y=0 once, and the data value y=3 was followed sequentially by the data value y=2 once.

In this way, a time-series data set of any number of data points can be condensed and represented by a "count" indicating how many times each unique pair of different data values appear sequentially in the time-series data set. Although the original time-series data set cannot be fully reconstructed from the condensed data set (i.e., the "count table"), the condensed data still provides important information regarding the time-series data set. For example, the condensed data set provides an indication/confirmation of how many "events" occurred in which the signal measured by the sensor fell below (or rose above) a particular threshold, an indication of maximum/minimum measured sensor values, and an indication of high deviations in sequential data points (indicative of rapid variation in the time-series data). As discussed in further detail below, the condensed data set generated by the method of FIG. 2 also encodes useful and important information regarding the overall variability of the time-series data signal.

The data size of the condensed data set can be further reduced by applying rounding to the values of the time-series data in order to reduce the number of unique data value pairs that appear in immediate succession in the time-series. For example, data values in the time-series can be rounded (e.g., to the nearest integer, to the nearest multiple of 10, to the nearest multiple of 5, etc.) before or after the method of FIG. 2 is applied to the data. In some particular implementations, a "dynamic" rounding is applied to one or more data sets in order to achieve a target number of unique data value pairs (or a target number of "nodes" in the graphical representation as discussed further below). As illustrated below, applying the same dynamic rounding to multiple different time-series data sets can help illustrated differing degrees of variation between the time-series data sets.

Figure 5:
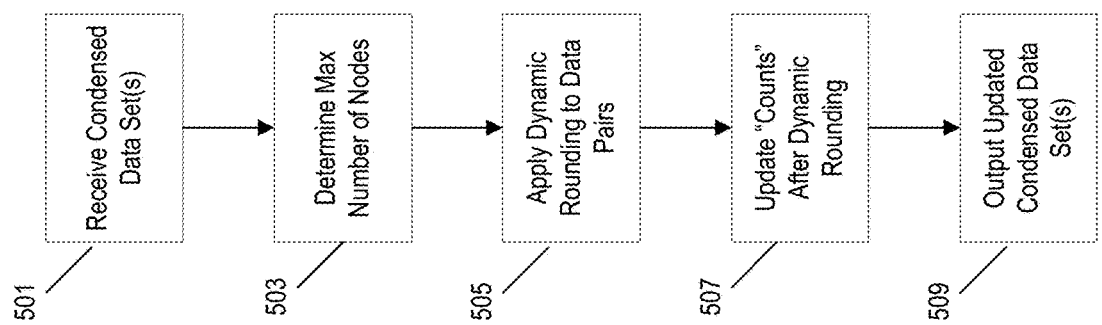
FIG. 5 is a flowchart of a method for further condensing the data output by the method of FIG. 3 using dynamic rounding.

FIG. 5 illustrates one example of a method for applying dynamic rounding to a data set that has been condensed according to the method of FIG. 2. First, the condensed data set is received (e.g., accessed from memory or generated by the method of FIG. 2) (step 501). The controller then determines a target or "maximum" number of nodes for a further condensation of the data (step 503) and applies a dynamic rounding to data values in order to achieve the target number of nodes (step 505). After the values in the condensed data set (e.g., the count table) are adjusted by dynamic rounding), the controller updates the "counts" to sum the counts for any data value pairs that become duplicative after the dynamic rounding is applied (step 507) and the further reduced/rounded data set is output (step 509).

In some implementations, a controller may be configured to apply dynamic rounding in order to reduce the data set to a total number of unique data values (or "nodes") that appear in one or more data value pairs of the count table. Alternatively, in some implementations, the controller may be configured to determine and apply an appropriate dynamic rounding to achieve a target or "maximum" number of unique data value pairs.

For example, the condensed data set illustrated in the "count table" of FIG. 4 includes five unique data value pair combinations ((0,2); (2,3); (3,1); (1,0); and (3,2)) and four unique data values/nodes (0, 1, 2, 3). A controller that is configured to apply "dynamic rounding" to reduce the total number of unique data values/nodes in the condensed data set to three unique values/nodes may determine (at step 505) to round the data values in the condensed data set to the nearest multiple of two. The values of the count table before the application of the dynamic rounding of FIG. 5 are represented below in Table 1, the values of the count table after the application of the dynamic rounding (i.e., after step 505 of FIG. 5) are represented below in Table 2, and the values of the count table after combining the "counts" for data value pairs that become redundant after the dynamic rounding (i.e. after step 507 of FIG. 5) are represented below in Table 3. As illustrated by this example, if the data values in the count table are rounded to the nearest multiple of two to reduce the total number of "nodes" in the condensed data set to three, the third and fifth entries in the original count table become redundant (both equal (4,2) after the dynamic rounding). Accordingly, the counts associated with the now-redundant entries are summed (now totaling two) and the redundant data value pair entry is deleted from the condensed data set.

TABLE 1

Original Condensed Data Set
(step 501 of FIG. 5)

| $x_i$ | $x_{i+1}$ | Count |
|---|---|---|
| 0 | 2 | 2 |
| 2 | 3 | 2 |
| 3 | 1 | 1 |
| 1 | 0 | 1 |
| 3 | 2 | 1 |

TABLE 2

Condensed Data Set after
Dynamic Rounding
(step 505 of FIG. 5)

| $x_i$ | $x_{i+1}$ | Count |
|---|---|---|
| 0 | 2 | 2 |
| 2 | 4 | 2 |
| 4 | 2 | 1 |
| 2 | 0 | 1 |
| 4 | 2 | 1 |

TABLE 3

Condensed Data Set after combining
redundant data value pairs
(step 505 of FIG. 5)

| $x_i$ | $x_{i+1}$ | Count |
|---|---|---|
| 0 | 2 | 2 |
| 2 | 4 | 2 |
| 4 | 2 | 2 |
| 2 | 0 | 1 |

As an additional example, if the dynamic rounding mechanism determines that the data values in the count table of FIG. 4 are to be rounded to the nearest multiple of five, the total number of unique values/nodes in the condensed data set is reduced to two (0, 5) and the number of unique data value pairs is also reduced to two ((0,5) and (5,0)). The data value pairs where both values, as a result of the rounding, are adjusted to the same value (e.g., the first and fourth entries in the count table) are deleted from the updated count table and data value pairs that become duplicative after the rounding (e.g., the third and fifth entries in the count table) are combined. This example is illustrated further in Tables 4-6 below in which Table 4 shows the values of the count table before dynamic rounding (i.e., after step 501 in FIG. 5), Table 5 shows the values of the count table after dynamic rounding (i.e., after step 507 of FIG. 5), and Table 6 shows the values of the count table after redundant data value pairs and data value pairs where the values are no longer different are removed from the count table (i.e., after step 509 of FIG. 5).

TABLE 4

Original Condensed Data Set
(step 501 of FIG. 5)

| $x_i$ | $x_{i+1}$ | Count |
|---|---|---|
| 0 | 2 | 2 |
| 2 | 3 | 2 |
| 3 | 1 | 1 |
| 1 | 0 | 1 |
| 3 | 2 | 1 |

TABLE 5

Condensed Data Set after Dynamic
Rounding (step 505 of FIG. 5)

| $x_i$ | $x_{i+1}$ | Count |
|---|---|---|
| 0 | 0 | 2 |
| 0 | 5 | 2 |
| 5 | 0 | 1 |
| 0 | 0 | 1 |
| 5 | 0 | 1 |

TABLE 6

Condensed Data Set after
combining redundant data
value pairs (step 505
of FIG. 5)

| $x_i$ | $x_{i+1}$ | Count |
|---|---|---|
| 0 | 5 | 2 |
| 5 | 0 | 2 |

As noted above, time-series data that is condensed according to the method of FIG. 2 and time-series data that is further condensed by the dynamic rounding of FIG. 5 can be stored to memory for potential future analysis. Amount of memory required to store the condensed data set (e.g., the "count table" format) is in many cases significantly less than the amount of memory that would be required to store the original time-series data. However, the condensed data set can still be analyzed to provide useful and important information about the original time-series data including, for example, maximum/minimum data values, maximum changes in adjacent data values, and information regarding variability of the time-series data.

Figure 6:
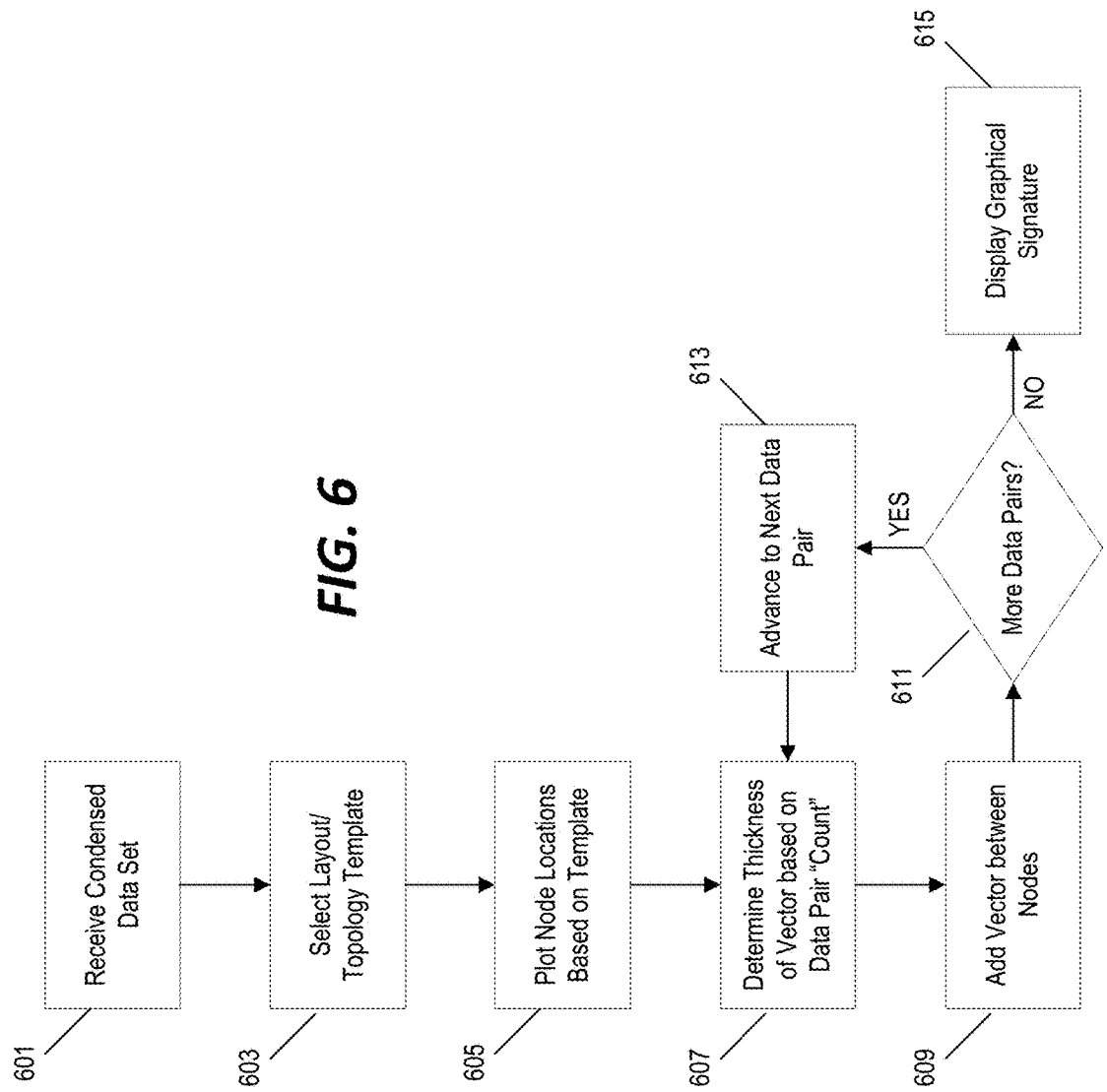
FIG. 6 is a flowchart of a method for generating and displaying a graphical signature indicative of time-series data using the system of FIG. 1.

In some implementations, the controller is configured to store or display the condensed data as a graphical representation of the condensed data set to provide a "graphical signature" of the original time-series data. This graphical signature can provide, for example, a visual indication of variability in the original time-series data and can be used to distinguish between a normal time-series signal condition and abnormal/anomalous conditions. FIG. 6 illustrates an example of a method for generating a graphical signature of a time-series data set based on a condensed data set (i.e., the "count table" format) generated by the method of FIG. 2. First, the condensed data set is received (e.g., accessed from memory, received as the output of the method of FIG. 2, or transmitted to the controller from a remote server or a cloud storage/computing environment) (step 601).

Figure 10:
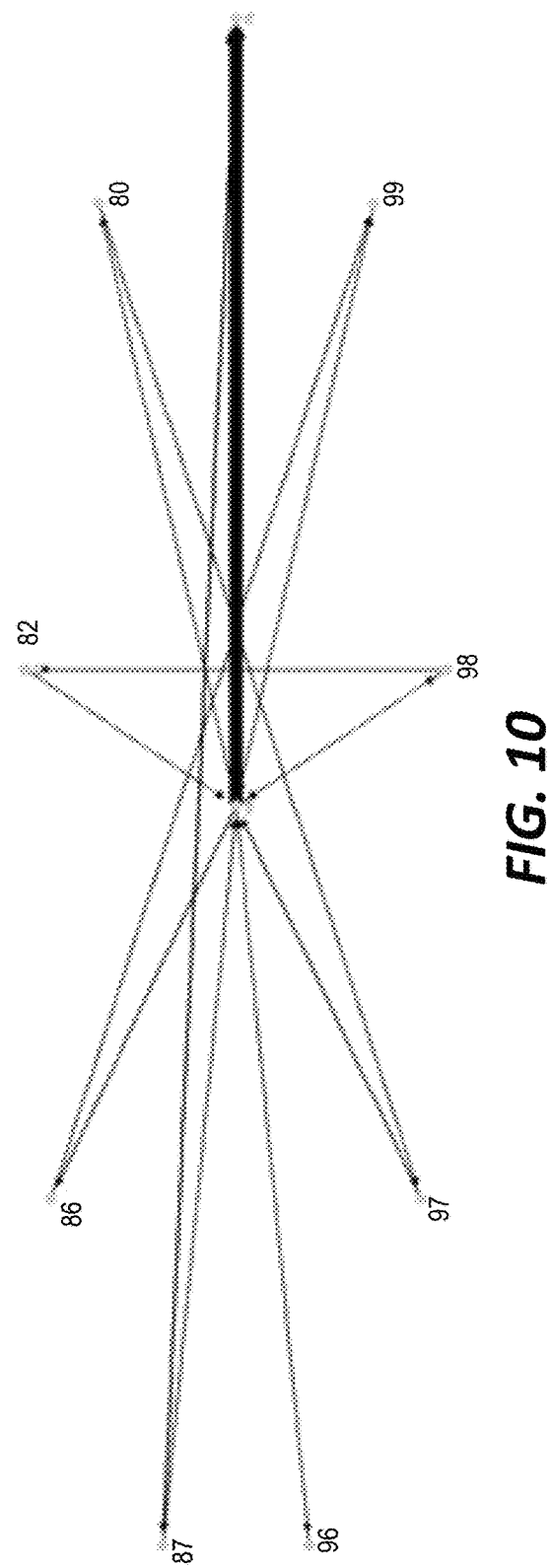
FIG. 10 is an example of a graphical signature of the time-series data of FIG. 8 generated by the method of FIG. 6.

The condensed data set is then analyzed in order to select an appropriate layout/topology template (step 603). In some implementations, the controller may be configured to store a plurality of predefined layout/topology templates that can be used to by the controller to generate a graphical signature for the time-series data. In various different implementations, the controller may be configured to select an appropriate template based on, for example, a number of different data value pairs in the condensed data set, a number of different nodes/values in the condensed data set, and the percentage of times that the same value appears in different unique data value pairs. For example, if a substantial majority of data value pairs include the number zero as one of its values, this may indicate that the original time-series data was largely based around the zero value with a relatively large number of short-term deviations. To illustrate this condition in a graphical signature, the controller may be configured to select a "star" layout (e.g., as illustrated in the example of FIG. 10 and described in further detail below) in which a node corresponding to the value that appears in the largest number of different data value pairs is positioned in a center of the graphical representation with nodes corresponding to other values that appear in the condensed data set arranged in an oval pattern around the central node.

Once an appropriate template is identified for the time-series data set, locations of individual nodes are plotted according to the selected template. Each individual node represents a different value that appears in one or more of the data value pairs in the condensed data set. Each unique data value pair in the condensed data set is illustrated in the graphical signature as a vector extending from one node to another node. Each vector begins at a node corresponding to a first value in the data value pair and ends at a node corresponding to the second value in the data value pair. The "count" for each data value pair (i.e., the number of times that the data value pair occurs sequentially in the time-series data) is represented by a thickness of the vector as illustrated in the graphical signature. For example, a data value pair with a relatively high "count" will be represented by a relatively thick vector in the graphical signature while a data value pair with a relatively low "count" will be represented by a relatively thin vector in the graphical signature.

Returning to FIG. 6, after the node locations are plotted based on the selected template (step 605), the controller determines a "thickness" for a vector corresponding to the first data value pair in the condensed data set based on the magnitude of the "count" for that first data value pair (step 607) and then adds a vector of the determined thickness to the graphical signature between the two nodes corresponding to the two values of the data value pair (step 609). If the condensed data set includes more data value pairs that have not yet been represented by vectors in the graphical signature (step 611), the controller advances to the next data value pair in the condensed data set (step 613) and repeats steps 607 and 609 for every data value pair in the condensed data set. When every data value pair in the condensed data set is represented as a vector in the graphical signature, the graphical signature is displayed on a display screen (step 615).

After the graphical signature is generated for a particular time-series data set, the graphical signature can be inspected visually by a user, analyzed by an automated process implemented by the controller, and/or stored to a memory. In some implementations, graphical signature for two different time-series data sets may be generated and compared. Because the node layout template and the vectors are determined based on an analysis of the condensed data set, a graphical signature for an abnormal/anomalous event will have a noticeably different appearance than a graphical signature for a normal time-series.

Figure 7:
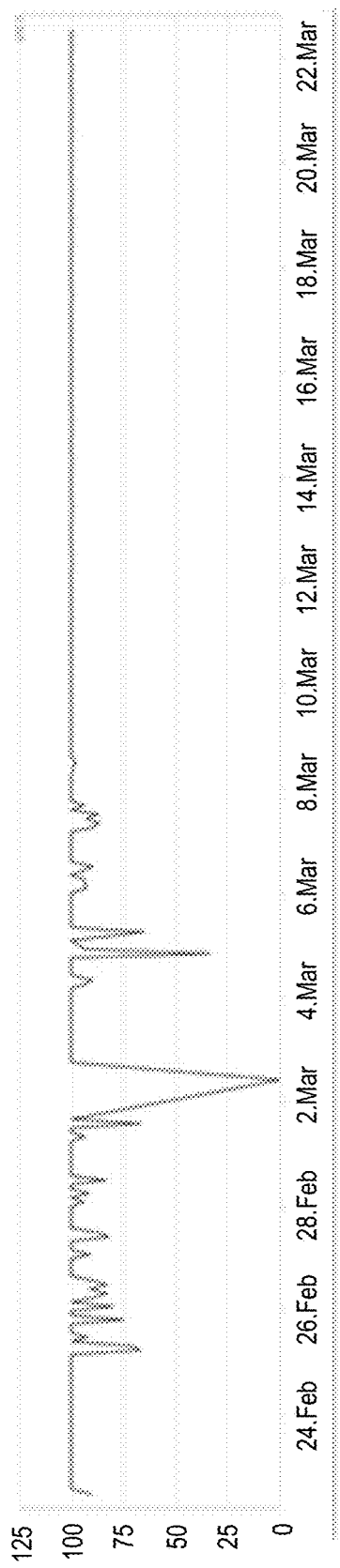
FIG. 7 is a graph of a first set of time-series data captured by the system of FIG. 1.
Figure 8:
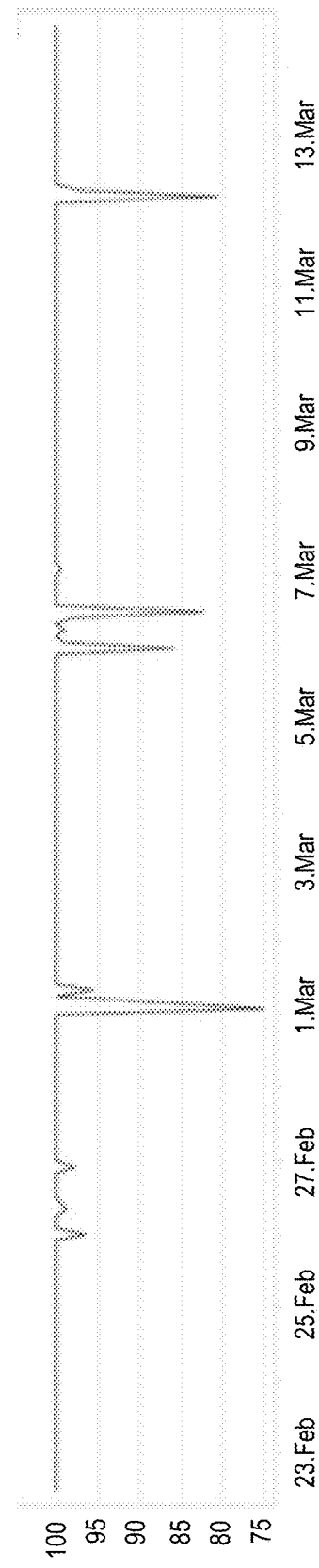
FIG. 8 is a graph of a second set of time-series data captured by the system of FIG. 1.

FIGS. 7 and 8 are time-series graphs of two different occurrences of the same process. FIG. 8 represents a successful operation while FIG. 7 illustrates an abnormal (or "less successful") occurrence of the same operation. In particular, the time-series of FIG. 7 illustrates some degree of functionality loss in the operation of a telemetry system. The time-series of FIG. 8 includes approximately 500 data points collected over a period of approximately 18 days. The time-series of FIG. 7 includes approximately 700 data points collected over approximately 26 days. Although there are certainly visible differences between the graphs of FIG. 7 and FIG. 8, it is hard to estimate the impact of the abnormal event that occurred during the time-series of FIG. 7 due to the complexity of the time-series profile. By applying the data condensation of FIG. 2 and generating a graphical signature according to FIG. 6 for each of these two time-series data sets, the system effectively condenses the data, provides a greatly simplified visual representation of these complex time-series data sets, and provides effective noise suppression. In some implementations, condensing the time-series data as a graphical signature also enables quicker and simplified interpretation and analysis of the original time-series data.

Figure 9:
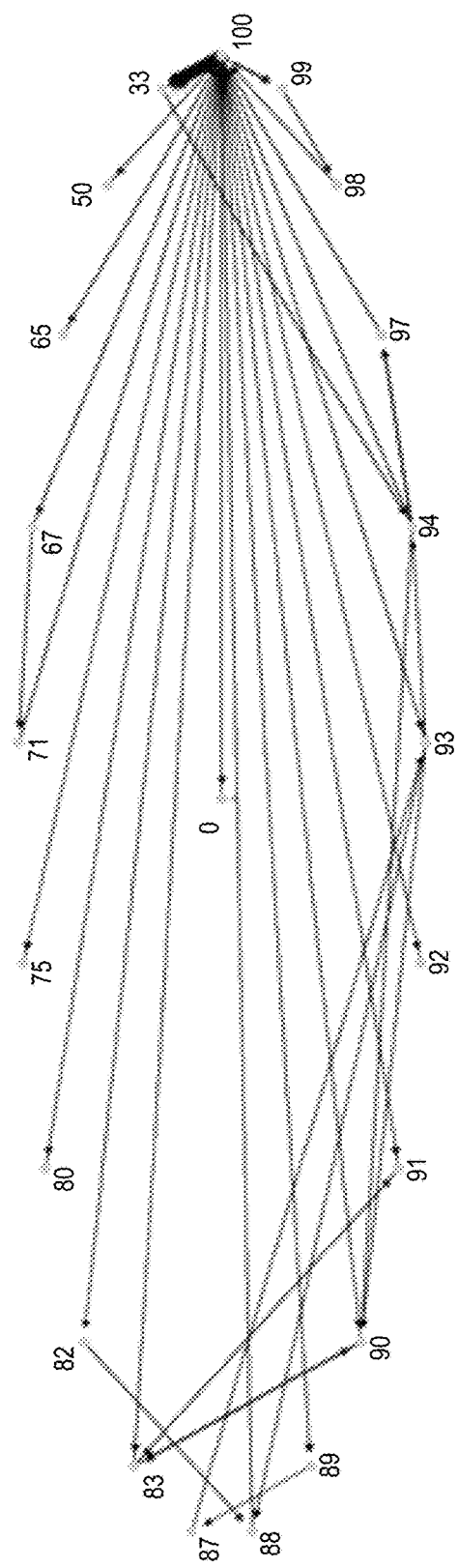
FIG. 9 is an example of a graphical signature of the time-series data of FIG. 7 generated by the method of FIG. 6.

FIGS. 9 and 10 are examples of graphical signatures generated for the time-series data of FIGS. 7 and 8, respectively, using the method of FIG. 6. The graphical signature for the abnormal event (FIG. 9) and the graphical signature for the normal event (FIG. 10) provide distinctively different condensed data summary visualization including, for example, a different number of nodes in the graphical signature and different layout/topology of the graphical signatures.

Figure 11:
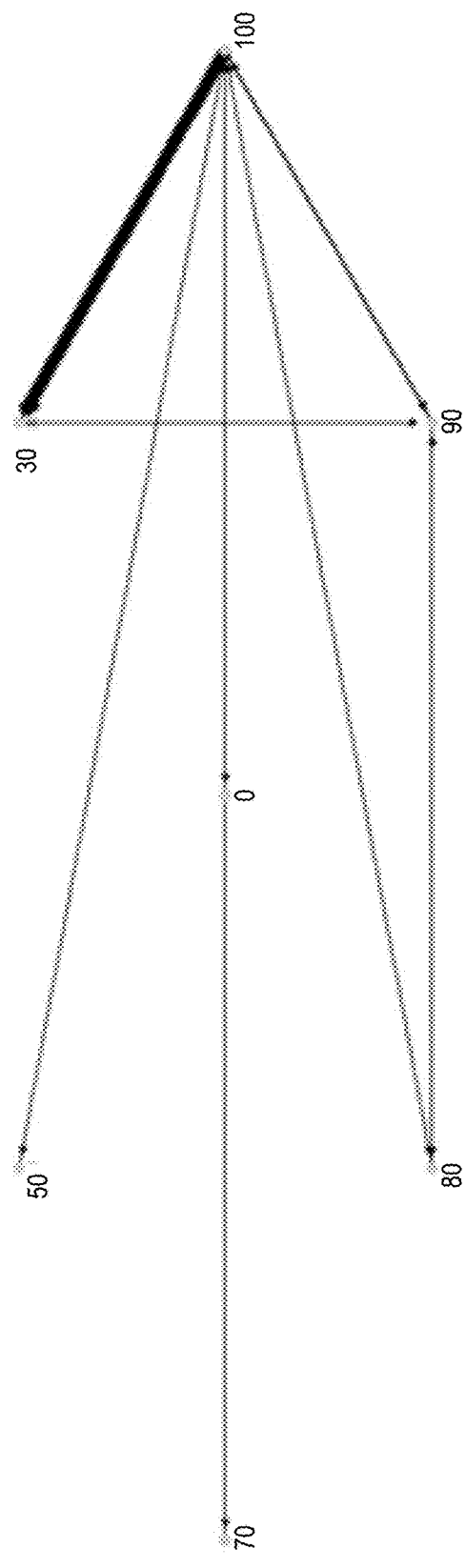
FIG. 11 is an example of a further condensed graphical signature of the time-series data of FIG. 7 generated by applying the dynamic rounding of FIG. 5 and the method of FIG. 6.
Figure 12:
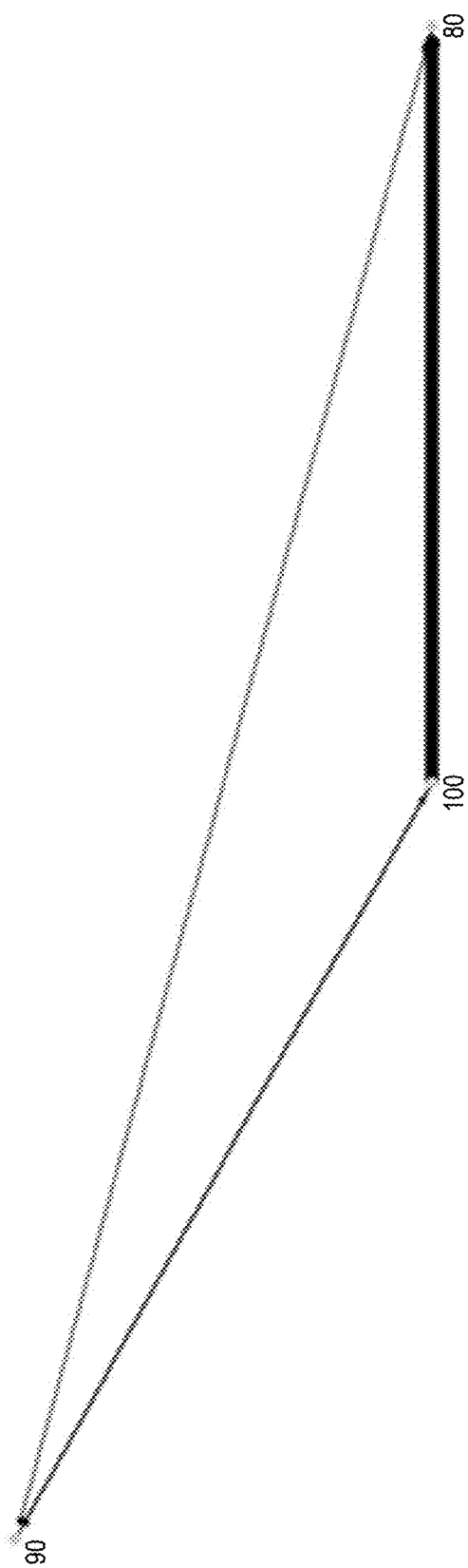
FIG. 12 is an example of a further condensed graphical signature of the time-series data of FIG. 8 generated by applying the dynamic rounding of FIG. 5 and the method of FIG. 6.

The data sets for each of these time-series can be further condensed using, for example, the dynamic rounding of FIG. 5. Each individual value in each data set is rounded to the nearest multiple of 10. Multiples of 10 were selected by the controller for the dynamic rounding operations based on a desired maximum number of nodes in the resulting condensed data sets. FIGS. 11 and 12 are examples of the graphical signatures for the time-series data of FIGS. 7 and 8, respectively, after dynamic rounding is applied to further condense the data sets. Note that, because the same dynamic rounding was applied to both time-series and because the time-series of FIG. 7 exhibits more variability than the time-series of FIG. 8, the further condensed graphical signature of FIG. 11 has more nodes (7 nodes) than the further condensed graphical signature of FIG. 12 (which has only 3 nodes). It is also noted that, by applying the condensing technique of FIG. 2 and the dynamic rounding of FIG. 5 before generating the graphical signature by the method of FIG. 6, the system is able to condense the 500 data points of the original time-series data of FIG. 8 into only three nodes in the graphical signature of FIG. 12 while still providing important information regarding operation behavior over the 18 day period of time.

The graphical signatures of FIGS. 9 and 11 both correspond to the time-series data set of FIG. 7 (i.e., the time-series data corresponding to some degree of functionality loss in the telemetry system). The graphical signatures of FIGS. 10 and 12 both correspond to the time-series data of FIG. 8 (i.e., the time-series data corresponding to normal operation of the telemetry system). The further condensed graphical signature of FIG. 11 highlights some operation-specific dynamics of the functionality loss in the telemetry system over the period corresponding tot eh time-series of FIG. 7. A comparison of the graphical signatures of FIGS. 9 and 10 (and a comparison of the further condensed graphical signatures of FIGS. 11 and 12) also provides confirmation that the time-series data of FIG. 8 is more stable than the time-series data of FIG. 7.

Figure 13:
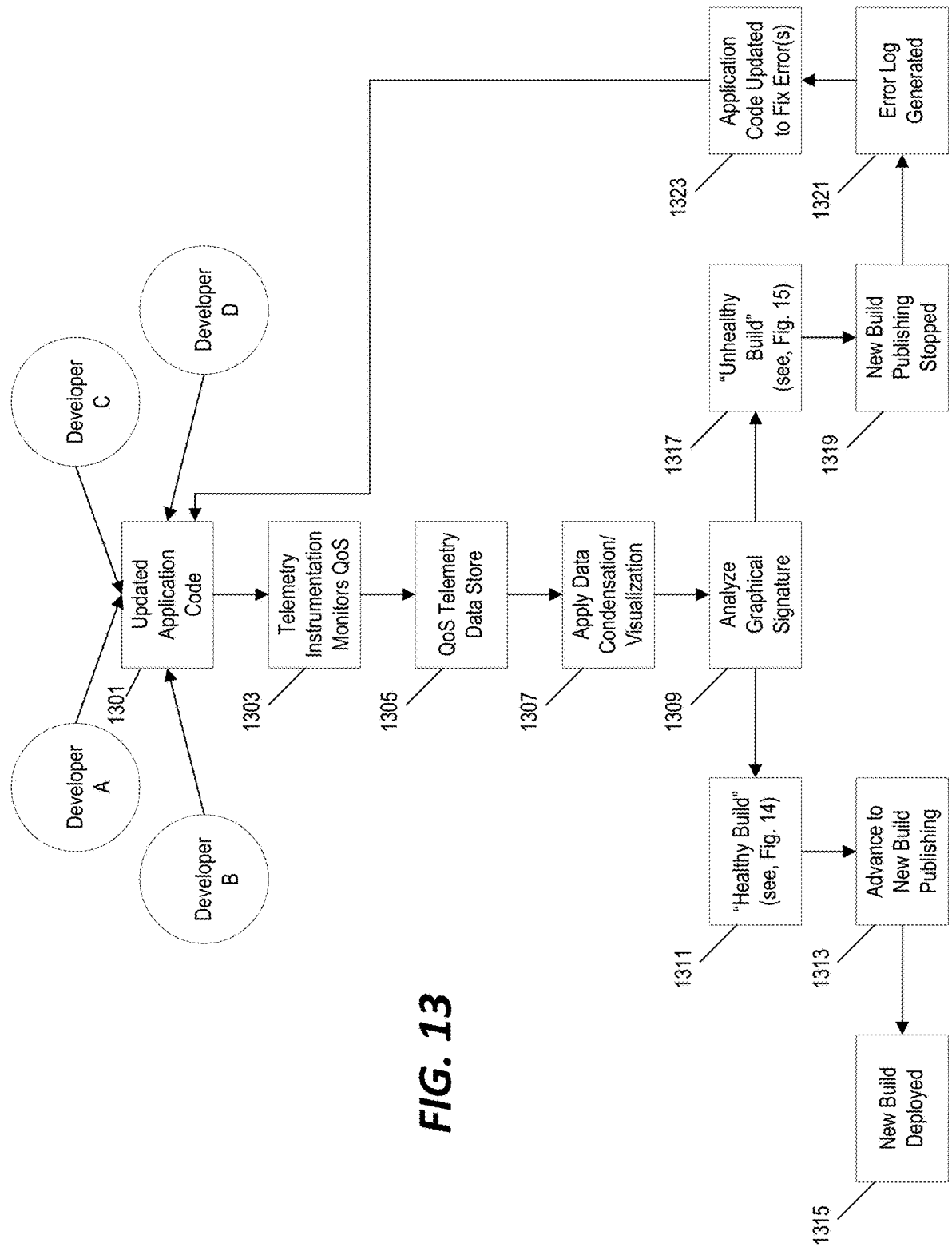
FIG. 13 is a flowchart of a method for using the data condensation and graphical signature analysis for testing a new software build for a telemetry service.

FIG. 13 illustrates one specific example of a system for updating, validating, and deploying software updates for a telemetry service configured to utilize the data condensing and graphical signature analysis techniques described above. Software engineers and service reliability engineers are presented with a large set of challenges due to scale and complexity of modern distributed cloud systems. Distributed services can follow a continuous deployment model where the application code is modified continuously and then updates are shipped/deployed to the customers on a schedule (e.g., weekly or daily). It can be a challenge to review a complete set of telemetry data for a large system that may have tens of thousands of instrumented operations and, accordingly, can produce tens or hundreds of thousands of time series. This data cannot be observed simultaneously due, for example, to the sheer size of the data objects and a limited capacity of the human eye to process a certain finite number of data points at one given time. However, by using the data condensing and graphical signature mechanisms described above, the telemetry data for each new build can be condensed down to a specific graphical signature that can be more readily classified as a "healthy build" or an "unhealthy build."

As illustrated in FIG. 13, the application code can be modified at any time during the continuous shipping cycle by any of a number of different developers (step 1301). Telemetry instrumentation of all operations is enabled and massive amounts of telemetry data are emitted from the application. This telemetry data includes, for example, a large number of individual quality of service (QoS) time series data sets (step 1303). This telemetry data is routed to a data store in real time (step 1305). Before "publishing" (e.g., deploying or shipping) a new "build" of the application software, the system applies that data condensation techniques described above to the QoS time series data sets in the data store and generates a "graphical signature" indicative of the state of the current build/update (e.g., is the current build a "healthy build" or an "unhealthy build") (step 1307).

Figure 14:
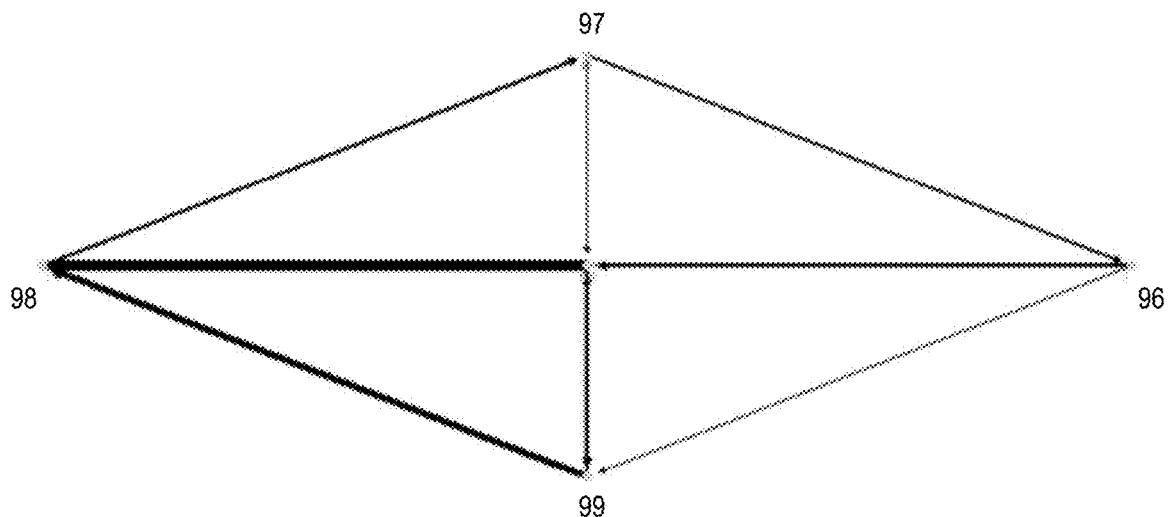
FIG. 14 is an example of a graphical signature indicative of a "healthy build" in the method of FIG. 13.
Figure 15:
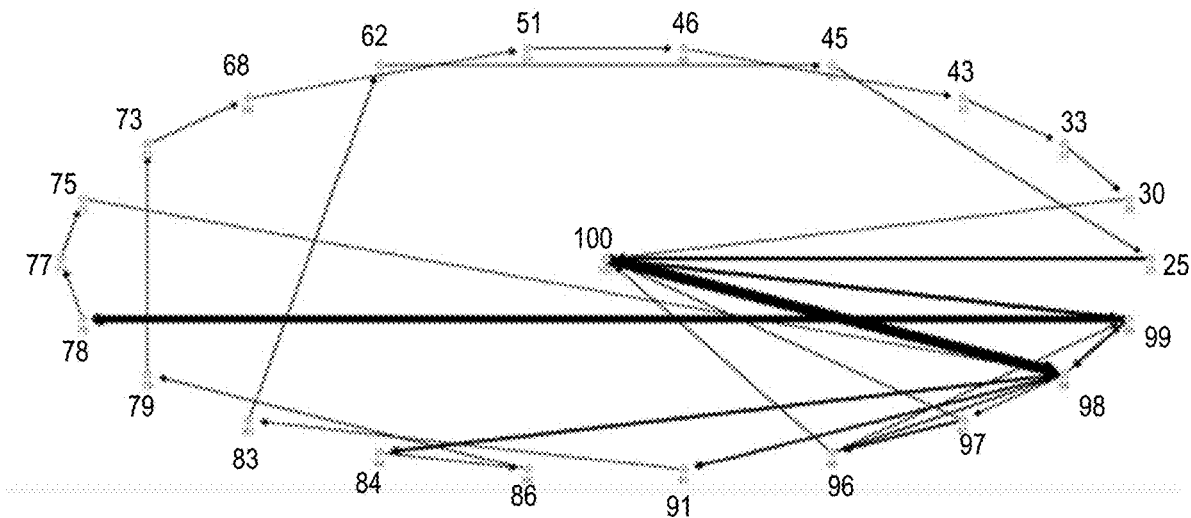
FIG. 15 is an example of a graphical signature indicative of an "unhealthy build" in the method of FIG. 13.

FIG. 14 illustrates an example of a graphical signature for a "healthy build" indicating fluctuations within an allowed range of quality of service (QoS) value changes. Conversely, FIG. 15 illustrates an example of a graphical signature for an "unhealthy build." The unhealthy signature includes more vectors and more nodes indicating a greater variation in QoS value changes.

Returning to the example of FIG. 13, the system is configured to automatically analyze the graphical signature to determine whether the signature is indicative of a "healthy build" or an "unhealthy build" (step 1309). In other implementations, this analysis of the graphical signature may be performed manually or with input from a "build release" engineer. If the graphical signature is determined to be indicative of a "healthy build" (step 1311), then the updated application code advances to New Build Publishing (step 1313) and the new build is deployed (step 1315). However, if the graphical signature is determined to be indicative of an "unhealthy build" (step 1317), then the publishing/deployment of the unhealthy build is stopped (step 1319) and negative customer impact is averted. An error log is generated (step 1321) and the development team is notified that a scheduled build release has been blocked. The development team reviews the recent changes and error logs to locate causes of the errors/regression and the application code is again updated to fix the problems. The process then returns to step 1301 where the system collects new QoS data for the "fixed" application code and generates a new graphical signature. This process is repeated until the application code is again identified as a "healthy build" (step 1311) and deployed to the customers (step 1315).

As should be apparent from the description above, in some implementations, time-series data of any size of range can be condensed by identifying pairs of neighboring values in the time-series data, rounding the values to integers (or other dynamically or statically defined multiples), and counting the number of occurrence of each unique combination of value pairs. This counting operation is used to convert the time-series data into a three column data set where each row (or "entry") in the new data set includes the first value in the data value pair ($f(x_i)$), the neighboring value in the data value pair ($f(x_{i+1})$), and a "count" indicating a number of times that the pair of values appears in immediate succession in the time-series data. A graph structure (i.e., a graphical signature) is then produced where nodes represent each unique value in the three-column data set and vectors connect nodes to represent each unique pair of values in the three-column data set. The structure can be plotted using a graphical library such as, for example, GGPlot R. By generating the graphical signature in this way, a complex time-series (e.g., up to 5000 or more sequential data points) can be represented in a simplified form that can then be classified as more stable operation or as less stable operation that requires attention/intervention.

The various systems and methods described in the examples above offer a significant advantage and can be used for automatic classification of complex time-series of extremely large size using the data condensation algorithms. Condensed visual data representations can also be classified and used for anomaly detection or assessment of the service of a variety of different systems in which time-series or other sequential data is collected/monitored. For example, although specific examples presented above describe using these techniques for monitoring function loss in a telemetry system, these techniques may also be applied in health and patient monitoring systems. For example, the data condensation techniques and the graphical signatures described herein can be applied to time-series data of an electrocardiogram. More specifically, anomalous sequences that may be indicative of a heart attack can be detected by analysis of the graphic signature. Similarly, the graphical signature can be created and displayed to a user on a personal device (e.g., a wrist-worn device with heart rate monitoring features) to provide the user a graphical representation of their current heart functionality (e.g., while at rest or while exercising).

In some implementations, the controller may be configured to apply a trained artificial intelligence (AI) mechanism such as, for example, a trained artificial neural network in the process of generating the condensed data set and/or the graphical signature. For example, in some implementations, an artificial neural network may be configured to receive some or all of the condensed data set (e.g., the output of FIG. 2) and to output an identification of an appropriate layout/topology template to be used for the graphical signature for that data series. An artificial neural network may also be utilized in some implementations during the dynamic rounding process. For example, the artificial neural network may be configured to receive the time-series data and/or the condensed data set (i.e., the initial "count" table) as inputs and to produce as output an identification of the appropriate multiple to which the data values are to be rounded during the dynamic rounding step. Alternatively, the artificial neural network in some implementations may be configured to receive the time-series data set or the initial condensed data set as inputs and to produce as an output a further condensed data set—such that the artificial neural network performs the entire process of dynamic rounding or, in some cases, the entire condensation process.

Accordingly, the embodiments provide, among other things, systems and methods for condensing sequential data as a data structure indicating a number of sequential occurrences of each of a plurality of unique data value pairs in the time-series data and generating a graphical signature from the condensed data that is indicative of aspects of the original time-series data. Various features and advantages are set forth in the following claims.

What is claimed is:

1. A system for condensing a sequential data set on a computer system, the system comprising a controller configured to:
receive the sequential data set including a plurality of data values in a serial sequence; and
generate a graphical signature indicative of the content of the sequential data set, the graphical signature including
a plurality of nodes, wherein each node of the plurality of nodes corresponds to a different data value in the sequential data set and
a plurality of vectors, wherein each vector of the plurality of vectors indicates a unique data value pair from the sequential data set by extending from a first node corresponding to a first data value to a second node corresponding to a second data value, and wherein the second data value immediately follows the first data value in the sequential data set.

2. The system of claim 1, wherein the controller is further configured to generate a condensed data set based on the sequential data set, wherein the condensed data set includes a data element for each of the plurality of unique data value pairs, wherein each unique data value pair includes a first data value and a second data value, wherein the second data value immediately follows the first data value in the sequential data set, and wherein each data element includes an identification of the first data value of the unique data value pair, an identification of the second data value of the unique data value pair, and a count indicative of the number of occurrences in the sequential data set of the first data value of the unique data value pair immediately followed by the second data value of the unique data value pair.

3. The system of claim 2, wherein each vector of the plurality of vectors includes a thickness corresponding to a number of occurrences of the unique data value pair in the sequential data set.

4. The system of claim 3, wherein a first unique data value pair with a higher number of occurrences in the sequential data set than a second unique data value pair is illustrated as a vector having a greater thickness than a vector corresponding to the second unique data value pair.

5. The system of claim 2, wherein the controller is configured to generate the graphical signature indicative of the content of the sequential data set by further selecting a node layout template from a plurality of stored node layout templates based on an analysis of the condensed data set, and wherein the controller is configured to position the plurality of nodes in the graphical signature by positioning each node of the plurality of nodes according to the selected node layout template.

6. The system of claim 2, wherein the controller is further configured to detect an occurrence of an anomalous event based on the graphical signature generated for the sequential data set.

7. The system of claim 6, wherein the controller is configured to detect the occurrence of the anomalous event by
comparing the graphical signature generated for the sequential data set to a second graphical signature indicative of a sequential data set for a normal operation, and
detecting a difference between the graphical signature and the second graphical signature.

8. The system of claim 6, wherein the controller is further configured to activate at least one actuator to modify an operation corresponding to the sequential data set in response to detecting the occurrence of the anomalous event.

9. The system of claim 2, wherein the controller is configured to generate the condensed data set by
rounding the first data value and the second data value of each unique data value pair to a nearest multiple of a rounding value, and
replacing in the condensed data set the first data value and the second data value of each unique data value pair with a rounded data value pair including the rounded first data value and the rounded second data value for the unique data value pair.

10. The system of claim 9, wherein the controller is configured to generate the condensed data set by
detecting two or more data elements in the condensed data set with a same data value pair after the rounding, and
in response to detecting the two or more data elements in the condensed data set with the same data value pair after rounding, replacing the two or more data elements with a single data element that includes the first data value common to the two or more data elements, the second data value common to the two or more data elements, and a count that is equal to a summed total of the count for each data element of the two or more data elements.

11. The system of claim 9, wherein the controller is further configured to determine a rounding value that will cause the rounding of the first data value and the second data value of each unique data value pair to reduce a number of unique data values in the condensed data set to below a defined threshold.

12. The system of claim 2, wherein the controller is further configured to determine whether a threshold value was exceeded in the sequential data set by analyzing the data values of the condensed data set to determine whether one or more data values exceed the threshold value.

13. The system of claim 2, wherein the controller is further configured to quantify a condition of stability in the sequential data set by calculating a value indicative of the condition of stability based at least in part on a number of unique data value pairs in the condensed data set.

14. The system of claim 1, wherein the controller is configured to receive the sequential data set by receiving a sequence of output values from a sensor at the sampling frequency, wherein each output value of the sequence of output values is indicative of a condition measured by the sensor.

15. The system of claim 1, wherein the controller is configured to receive the sequential data set by receiving a sequential data set indicative of a functioning of a telemetry system.

16. A method for condensing a sequential data set on a computer system, the method comprising:
  receiving, by the computer system, the sequential data set including a plurality of data values in a serial sequence;
  generating, by the computer system, a graphical signature indicative of the content of the sequential data set, the graphical signature including
    a plurality of nodes, wherein each node of the plurality of nodes corresponds to a different data value in the sequential data set and
    a plurality of vectors, wherein each vector of the plurality of vectors indicates a unique data value pair from the sequential data set by extending from a first node corresponding to a first data value to a second node corresponding to a second data value, wherein the second data value immediately follows the first data value in the sequential data set; and
  generating, by the computer system, a condensed data set based on the sequential data set, wherein the condensed data set includes a data element for each of the plurality of unique data value pairs, wherein each unique data value pair includes a first data value and a second data value, wherein the second data value immediately follows the first data value in the sequential data set.

17. The method of claim 16, wherein generating the condensed data set based on the sequential data set includes generating the condensed data set, and wherein each data element of the condensed data set includes an identification of the first data value of the unique data value pair, an identification of the second data value of the unique data value pair, and a count indicative of the number of occurrences in the sequential data set of the first data value of the unique data value pair immediately followed by the second data value of the unique data value pair.

18. A method of generating a graphical signature of a sequential data set, the method comprising:
  receiving the sequential data set including a plurality of data values in a serial sequence; and
  generating the graphical signature of the sequential data set, wherein the graphical signature includes
    a plurality of nodes, wherein each node of the plurality of nodes corresponds to a different data value in the sequential data set, and
    a plurality of vectors, wherein each vector indicates a unique data value pair from the sequential data set by extending from a first node corresponding to a first data value to a second node corresponding to a second data value, and wherein the second data value immediately follows the first data value in the sequential data set.

* * * * *